(No Model.)

S. N. SMITH.
LACING HOOK.

No. 245,573. Patented Aug. 9, 1881.

*Fig.2.*         *Fig.4.*

*Fig.3.*         *Fig.5.*

Attest:
R. H. Barnes
L. W. Lucy

Inventor:
Stephen N. Smith
by Ellis Spear
Atty

UNITED STATES PATENT OFFICE.

STEPHEN N. SMITH, OF PROVIDENCE, RHODE ISLAND.

LACING-HOOK.

SPECIFICATION forming part of Letters Patent No. 245,573, dated August 9, 1881.

Application filed June 25, 1881. (No model.)

*To all whom it may concern:*

Be it known that I, STEPHEN N. SMITH, of Providence, in the county of Providence and State of Rhode Island, have invented a new and useful Improvement in Lacing-Hooks; and I do hereby declare that the following is a full, clear, and exact description of the same.

My invention is an improved lacing-stud, designed to secure economy of the material in manufacturing, a neat and finished appearance when completed, and a secure and useful hook when attached to the shoe or other article to which it may be applied.

Heretofore lacing-studs of various forms have been struck up out of sheet metal, designed for secure attachment and more or less for neatness of appearance. Such a hook is shown in the patent of Briggs, of December 9, 1879, No. 222,449, and there are others varying from this in certain details of construction and in the shape of the blank.

My invention consists in the peculiar shape of the stud, all as hereinafter fully set forth, and as shown in the accompanying drawings, in which—

Figure 1:
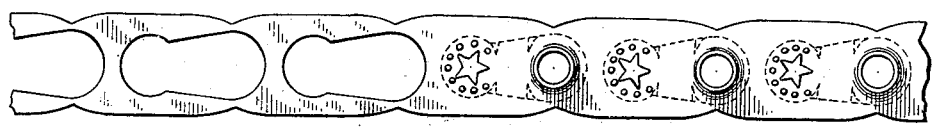
Figure 1:
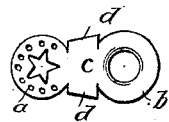
Figure 1:
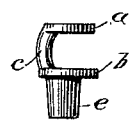
Figure 1:
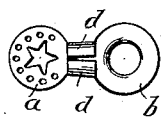
Figure 1:
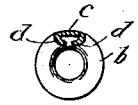

Figure 1 shows a strip from which the blanks are cut out. Fig. 2 shows the blank with the wings cut to form the shank. Fig. 3 represents the wings as bent. Fig. 4 shows a side elevation of the finished stud, and Fig. 5 a cross-section through the shank of the same.

In forming this stud I first strike out the blanks from a strip of sheet metal in which the eyelets have been formed a suitable distance asunder, as shown in Fig. 1. This blank then consists of two disks, $a$ $b$, with an intermediate continuous strip of metal, $c$, between the two, having wings $d$ $d$ on its sides. When these wings are turned in upon the shank they assume the form substantially such as is shown in Fig. 3; but manifestly the precise shape of the disks $a$ and $b$ need not be strictly adhered to.

It will be observed that the disks $a$ $b$ are substantially alike in size, and that the wings occupy the space upon the shank between the two disks, so that the blank is cut out with very little waste of material. The disks are bent at right angles to the shank $c$, so as to be parallel with each other, with the previously-formed eyelet-connection $e$ placed outward, as shown in Fig. 4.

The shank may be made by bending in any convenient manner the two wings inward until the edges meet or nearly meet, forming a tubular or flattened shank having suitable bearing-surface for the lace. The disk $a$, which forms the top, may be struck up in any ornamental design.

The disk forms a substantial bearing-surface upon the article to which the stud is attached, and the eyelet a secure and convenient mode of attachment.

I am aware that a sheet-metal lacing-hook has been provided with a fastening-eyelet formed by bending side wings into cylindrical shape.

I am also aware that the method of forming the shank by bending wings around is not new, and I do not broadly claim either the wings or the making of studs out of sheet metal; but What I do claim is—

The improved sheet-metal lacing-stud, consisting of the disks $a$ $b$, the eyelet-projection $e$, and the shank $c$, composed of side wings, $d$ $d$, bent into tubular form, as shown.

In testimony whereof I have signed my name to this specification in the presence of two subscribing witnesses.

STEPHEN N. SMITH.

Witnesses:
GILMAN E. JOPP,
SANFORD C. HONY.